(12) United States Patent
Takatsuka et al.

(10) Patent No.: US 8,171,971 B2
(45) Date of Patent: May 8, 2012

(54) DRIVING APPARATUS FOR TIRE BUILDING DRUM

(75) Inventors: Tomoyuki Takatsuka, Osaka (JP);
Hirokatsu Mizukusa, Osaka (JP)

(73) Assignee: Toyo Tire & Rubber Co., Ltd.,
Osaka-shi, Osaka (JP)

( * ) Notice: Subject to any disclaimer, the term of this patent is extended or adjusted under 35 U.S.C. 154(b) by 547 days.

(21) Appl. No.: 12/294,777

(22) PCT Filed: Mar. 31, 2006

(86) PCT No.: PCT/JP2006/306950
§ 371 (c)(1),
(2), (4) Date: Apr. 2, 2009

(87) PCT Pub. No.: WO2007/116502
PCT Pub. Date: Oct. 18, 2007

(65) Prior Publication Data
US 2010/0230055 A1 Sep. 16, 2010

(51) Int. Cl.
*B29D 30/26* (2006.01)
(52) U.S. Cl. ............... 156/394.1; 156/398; 156/414; 156/415; 156/416; 156/417
(58) Field of Classification Search ............ 156/394.1, 156/398, 414, 415, 416, 417; *B29D 30/24, B29D 30/26*
See application file for complete search history.

(56) References Cited

U.S. PATENT DOCUMENTS

| | | | |
|---|---|---|---|
| 4,780,171 A * | 10/1988 | Byerley | ............ 156/417 |
| 5,308,437 A | 5/1994 | Osa | |
| 5,770,004 A | 6/1998 | Ogawa | |

FOREIGN PATENT DOCUMENTS

| | | |
|---|---|---|
| JP | 6-51372 A | 2/1994 |
| JP | 8-318579 A | 12/1996 |
| JP | 11-165358 A | 6/1999 |
| JP | 2003-89158 A | 3/2003 |

OTHER PUBLICATIONS

International Search Report of PCT/JP2006/306950, date of mailing Jul. 4, 2006.

* cited by examiner

*Primary Examiner* — Katarzyna Wyrozebski Lee
*Assistant Examiner* — Joshel Rivera
(74) *Attorney, Agent, or Firm* — Westerman, Hattori, Daniels & Adrian, LLP

(57) ABSTRACT

The invention provides a driving apparatus for a tire building drum which can reduce load when the drum is rotating, which enables stable expanding and contracting operations and in which a center shaft portion (2) of the building drum (D) is made up of a cylindrical outer shaft (3) and an inner threaded shaft (4), the driving apparatus including a cylindrical outer shaft (13) which is coupled to the outer shaft (3), an inner shaft (14) coupled to the threaded shaft (4), a first motor (15) which is a rotational driving means coupled to the outer shaft (13) for rotating the drum, and a second motor (20) which is a rotational driving means coupled to the inner shaft (14) via a clutch (21) in such a manner as to be engaged with and disengaged from the inner shaft for expanding or contracting the drum, wherein by switching the clutch (21), when the drum is rotating, the second motor (20) is held out of engagement with the inner shaft (14), while when the drum is expanded or contracted, the second motor (20) is held in engagement with the inner shaft (14).

2 Claims, 2 Drawing Sheets

DRIVING APPARATUS FOR TIRE BUILDING DRUM

TECHNICAL FIELD

The present invention relates mainly to a driving apparatus for a tire building drum such as a belt building drum.

BACKGROUND ART

Conventionally, in a building process in the manufacture of tires, there is known a building method in which for example, a cylindrical carcass band is built by affixing an inner liner made of a rubber material and carcass plies, which are a reinforcement member including a rubber chafer and cords, onto a circumferential surface of a building drum in such a manner as to lie on top of one on another, then, beads and sides are built into a green casing on a primary building drum, following this, the green casing is transferred on to a secondary shape deformable building drum so as to deform the green casing into a toroidal shape, and belts incorporating cords therein and tread rubber are affixed thereto to thereby build a green tire.

In addition, in recent years, there has also been proposed a method in which a carcass band and a belt/tread band which is made up of a carcass band and a belt and is adapted to be laid on the carcass band are built in separate steps in advance, and these band and belt/tread band are then combined together to be built up.

In implementing the building methods, the so-called belt building drum for building the belt/tread band is an expandable and contractible drum which is made up of a large number of segments which are divided in a circumferential direction, and when building a belt/tread band, the respective segments are held in such a state that they are expanded diametrically, and the respective members are affixed to the circumferential surface of the drum in such a manner as to lie on top of one on another to eventually build up the belt/tread band. Then, when removing the cylindrical belt/tread band so built for transfer to a subsequent step, the respective segments of the belt building drum are diametrically contracted in such a state the band is grabbed from an outer circumference thereof by a grabbing device of a transfer apparatus, whereby the removal of the band is implemented.

Because of this, in the belt building drum, a central shaft portion acting as a drum shaft is coupled to a motor acting as a rotating driving means of a driving apparatus, and the respective segments are coupled to an expanding/contracting driving means via an expanding/contracting mechanism.

As expanding/contracting mechanisms for building drums, various types of mechanisms such as those utilizing a cylinder device and a threaded shaft are adopted to cope with difference in type and building step of bands to be built.

As one of them, for example, in the case of a belt building drum, there is known a mechanism in which a threaded shaft is provided inside a cylindrical outer shaft which constitutes a central shaft portion of a building drum in such a manner as to rotate relative to the outer shaft, and a moving member which is thread fitted on the threaded shaft and respective segments are coupled together via a sloping guide such as a tapered cone or a linkage member, so that the moving member is moved in an axial direction by means of rotation of the threaded shaft, whereby the respective segments are operated to expand or contract.

In this case, as a driving device for the building drum, there are required a rotational driving means for rotating the outer shaft and a rotational driving means for rotating the threaded shaft for expanding/contracting operations. Motors are used as these rotational driving means.

Incidentally, when the drum is rotated for a belt and a tread rubber to be affixed together for building or to be pressed by a stitcher roller, the outer shaft and the inner threaded shaft need to synchronize to rotate in order to activate neither expanding operation nor contracting operation. However, in the event that the rotational driving means provided on the driving device for expanding/contracting operations, that is, the motor remains coupled to the threaded shaft, load against the rotation becomes large due to braking action by the motor, and a larger quantity of electric power becomes necessary by such an extent that the rotation is affected by the braking action, this being uneconomical.

Patent Document No. 1: JP-A-2003-89158

DISCLOSURE OF THE INVENTION

Problem that the Invention is to Solve

The invention has been made to solve the problem above and provides, as a driving apparatus for a tire building drum such as a belt building drum, a driving apparatus which is economical due to load being reduced during rotation of the drum, and moreover which facilitates the expanding or contracting operation of the drum to thereby ensure such operations.

Means for Solving the Problem

A driving apparatus for a tire building drum of the invention which is made to solve the problem above is a driving apparatus for a tire building drum in which a drum main body is configured to expand or contract by a plurality of segments which are divided in a circumferential direction and a central shaft portion is made up of a cylindrical outer shaft and a threaded shaft provided inside thereof, including a cylindrical outer shaft which is coupled to the outer shaft of the building drum, an inner shaft coupled to the threaded shaft, a first rotational driving means coupled to the outer shaft for rotating the drum, and a second rotational driving means coupled to the inner shaft via a clutch in such a manner as to be engaged with and disengaged from the inner shaft for expanding or contracting the drum, characterized in that by switching the clutch, when the drum is rotated through operation of the first rotational driving means, the second rotational driving means is held out of engagement with the inner shaft, while when the drum is expanded or contracted, the second rotational driving means is held in engagement with the inner shaft.

According to the driving apparatus for a tire building drum, although the inner threaded shaft and the inner shaft coupled thereto rotate in synchronism with rotation of the outer shaft of the building drum when the drum is rotated through operation of the first rotational driving means, as this occurs, by keeping the clutch provided between the inner shaft and the second rotational driving means for expanding or contracting the drum out of engagement (disengagement), the second rotational driving means is disengaged from the inner shaft, whereby load produced by the second rotational driving means is prevented totally from acting on the rotation of the inner shaft, and thereby the inner shaft is allowed to rotate smoothly.

In addition, when the drum is expanded or contracted, by switching the clutch, the second rotational driving means is kept in engagement with the inner shaft, whereby the threaded shaft can be rotated by rotating the second rotational driving means, and thereby the respective segments of the drum main body can be made to perform expanding or contracting operations in a stable fashion.

In the driving apparatus, the clutch is preferably controlled such that the second rotational driving means is held out of engagement with the inner shaft on occasions other than one the drum is expanded or contracted, whereby there is no fear that the drum main body is expanded or contracted unintentionally on the occasions other than one the drum is expanded or contracted.

As the first rotational driving means and the second rotational driving means, motors are used which are driven to rotate, respectively, by signals from a control unit. By this configuration, the control of both the motors is facilitated. In particular, the motor acting as the second rotational driving means is made to rotate forwards and backwards by signals from the control unit which indicate rotational directions, whereby the threaded shaft is allowed to rotate forwards and backwards, and hence, the respective segments are made, in an ensured fashion, to perform a diametrically expanding operation or a diametrically contracting operation.

Advantage of the Invention

As has been described heretofore, according to the driving apparatus for a tire building drum, when the drum is rotated through operation of the first rotational driving means for rotating the drum, since the clutch between the second rotational driving means for expanding or contracting the drum and the inner shaft is held out of engagement (in disengagement), the smooth rotation is enabled without being affected by the load produced by the second rotational driving means, the quantity of electric power necessary for rotation of the drum can be reduced, thereby making it possible to increase the economy of the driving apparatus.

Moreover, when the drum is expanded or contracted, the first rotational driving means is stopped, and the clutch is switched to be engaged, so as to actuate the second rotational driving means, whereby only the inner shaft and the threaded shaft of the building drum which is coupled to the inner shaft can be rotated stably and in an ensured fashion, thereby making it possible to ensure the expanding or contracting operations of the respective segments of the drum main body.

In addition, since switching between rotating operations and expanding or contracting operations of the building drum is facilitated, the load while the drum is rotating can be reduced, which contributes to the realization of automatic tire building.

BEST MODE FOR CARRYING OUT THE INVENTION

Next, a mode for carrying out the invention will be described based on an embodiment shown in the drawings.

FIG. 1 is a sectional view showing a main part of an embodiment of a driving apparatus for a tire building drum according to the invention, and FIG. 2 is a sectional view showing an expanding/contracting mechanism of the building drum.

In the figures, reference character D denotes a building drum, and in this embodiment, the building drum is shown as taking the form of a so-called belt building drum for building a cylindrical belt/tread band which is made up of a belt layer and a tread rubber layer which are used in building a tire, and reference numeral 1 denotes a drum main body, and 2 a center shaft portion. The drum main body 1 is made up of a plurality of segments 1a which are divided in a circumferential direction in such a manner as to expand or contract. In addition, the center shaft portion 2 of the drum main body 1 is made to have a double shaft construction which is made up of a cylindrical outer shaft 3 for rotating the drum and a threaded shaft 4 for expanding or contracting the drum which is passed through inside the outer shaft 3 for relative rotation.

In the example shown in the figures, as an expanding/contracting mechanism of the respective segments 1a, a moving member 5, which is thread fitted on a threaded portion 4a of the threaded shaft 4 in such a manner as to move axially by means of rotation of the threaded shaft 4, and the respective segments 1a are coupled to each other via linkage members 6 which are pin coupled, respectively, to the moving member 5 and the segments 1a in such a manner as to change their angles in an axial direction, and the respective segments 1a are made to perform expanding or contracting operations, that is, a diametrically expanding operation or a diametrically contracting operation by the movement of the moving member 5 in the axial direction via the linkage members 6. The direction of the expanding or contracting operation is determined by the direction in which the moving member 5 moves, and for example, when the diametrically expanding operation is performed by the moving member 5 moving in one direction, the diametrically contracting operation is made to be performed by the moving member 5 moving in the other direction. Reference numeral 7 denotes a support portion which supports the respective segments 1a in such a manner that the segments can be displaced in a radial direction but are restrained from being displaced in the axial direction relative to the outer shaft 3. The threaded shaft 4 does not have to be threaded along the full length thereof and hence, the threaded portion 4a may only have to be formed over at least a length corresponding to the moving range of the moving member 5.

Note that as the expanding/contracting mechanism of the respective segments 1a, an expanding/contracting construction can be used to realize the mechanism which makes use of a sloping guide in place of the linkage members.

A driving apparatus 10 of the invention is such as to rotationally drive the outer shaft 3 of the center shaft portion 2 of the building drum D and the threaded shaft 4 inside the outer shaft 3. A spindle portion 12 of this driving apparatus 10 has a double shaft construction made up of an outer shaft 13 to which the outer shaft 3 of the building drum D is coupled and an inner shaft 14 to which the threaded shaft 4 is coupled. Reference numeral 8 denotes a coupling portion where the outer shaft 3 and the outer shaft 13 are bolt fastened together, and reference numeral 9 denotes a coupling portion where the threaded shaft 4 and the inner shaft 14 are coupled together through angular shaft engagement.

In the case shown in the figures, the spindle portion 12 is supported rotatably and substantially horizontally by bearings 32, 32 which are provided in a plurality of locations (two locations in the figure) in such a manner as to be spaced apart from each other in the axial direction in a support portion 31 where the outer shaft 13 is provided on a moving support table 30, whereby the spindle portion 12 is provided to support the building drum D, which is coupled to the spindle portion 12, in a cantilever-like fashion. The inner shaft 14 is rotatably supported by a bearing 33 provided inside the outer shaft 13 at a location in the vicinity of an end portion which lies on a side where the drum is supported and on an opposite side to the drum supporting side, a projecting end side portion 14a, which extends longer in the axial direction than the outer shaft 13, passes through a central opening 34a in a support member 34 on the moving support table 30 so as to be supported therein.

To the outer shaft 13 of the spindle portion 12, a first motor 15, acting as a first rotational driving means for rotating the drum, is coupled to the end portion on the opposite side to the drum supporting side, and the first motor 15 is provided such that the outer shaft 13 and the outer shaft 3 of the building drum D which is coupled to the outer shaft 13 are made to rotate by rotation of the first motor 15, so as to rotationally drive the drum main body 1. The first motor 15 is an outer rotor type annular motor and is mounted on the support member 34 outwards of the projecting end side portion 14a of the inner shaft 14 extending further in the axial direction than the outer shaft 13, and an end portion 16a of a cylindrical coupling member 16 fixed to a rotor member (whose illustration is omitted) of the first motor 15 is bolt fastened to an end portion 13a of the outer shaft 13. Reference 17 denotes the fastening portion.

In addition, a second motor 20, which acts as a second rotational driving means for expanding or contracting the drum and which can rotate forwards and backwards, is coupled to a shaft end portion of the inner shaft 14 of the spindle portion 12 which passes through the first motor 15 and the central opening 34a of the support member 34 to project therefrom via clutch in such a manner as to freely come into and out of engagement therewith. Namely, the second motor 20 is provided in such a manner as to be switched between a disengaged state (a decoupled state) and an engaged state with respect to the inner shaft 14 by the clutch 21. Then, in the engaged state, by rotating the second motor 20, the threaded shaft 4 of the building drum D is configured to be rotated via the inner shaft 14.

The second motor 20 is fixedly attached to the support member 34 via support legs 22, and the clutch 21 is provided between an output shaft 23 of the second motor 20 and the shaft end portion of the inner shaft 14. As this clutch 21, clutches of various constructions can be used which can be engaged and disengaged to make and interrupt power transmission by, for example, providing engaging members 21a, 21b which can be brought into engagement with each other at the shaft end portion of the inner shaft 14 and an end portion of the output shaft 23. In this embodiment, however, an electromagnetic clutch is used due to easy operation control.

The first motor 15 for rotating the drum and the second motor 20 for expanding or contracting the drum are connected individually and electrically to a control unit (not shown) and are configured to be controlled to rotate as required according to the necessity in various operations in a building cycle such as affixing belts in a building operation and a removing operation of a belt/tread band so built by command signals from the control unit. In particular, the second motor 20 is configured to rotate forwards or backwards by signals from the control unit which indicate rotational directions, whereby the moving direction of the moving member 5 can appropriately be selected by way of forward rotation or backward rotation of the threaded shaft 4, so that the respective segments 1a are made to perform diametrically expanding operations or diametrically contracting operations. In addition, the clutch 21 is also electrically connected to the control unit and is provided to perform a switching operation as required according to the necessity in the building cycle by the command signals from the control unit.

In particular, by switching the clutch 21, while the drum is rotating by operation of the first motor 15, the second motor 20 is set to be held in the disengaged state (the decoupled state) relative to the inner shaft 14, and when the drum is expanded or contracted with the rotation of the drum by the first motor 15 brought to a halt, the second motor 20 is set to be held in the engaged state relative to the inner shaft 14.

The operating condition of the driving apparatus 10 for the tire building drum D will be described. The building drum D, which is coupled to and supported on the spindle portion 12 of the apparatus, holds the segments 1a of the drum main body 1 in such a state that the segments 1a are diametrically expanded and performs, for example, a building operation of affixing a belt and a tread rubber and a stitching operation by a stitcher (not shown) such as a pressing roller. As this occurs, the drum rotating first motor 15 connected to the outer shaft 13 of the spindle portion 12 is activated into operation, and rotation of the first motor 15 is transmitted to the outer shaft 3 of the building drum D via the inner shaft 13, so as to rotate the building drum D.

As this occurs, the clutch 21, which is interposed between the inner shaft 14 of the spindle portion 12 and the drum expanding/contracting second motor 20, is held in the disengaged state (the decoupled state), so that the drum expanding/contracting second motor 20 is decoupled from the inner shaft 14. To make this happen, when the drum is rotating, although the threaded shaft 4 inside the outer shaft 3 and the inner shaft 14 coupled to the threaded shaft 4 are rotated in association with rotation of the outer shaft 3, load by the second motor 20 is not applied to the rotation of the shafts, allowing the shafts to rotate smoothly, and hence, this also can reduce the quantity of electric power to be used. In addition, when the first motor 15 is stopped, the rotation of the building drum D is brought to a stop.

Then, in a drum expanding or contracting operation such as when the drum is diametrically contracted for removal of a belt/tread band after it has been built or when the drum is diametrically expanded after the removal of the belt/tread band, the second motor 20 is held in the engaged state relative to the inner shaft 14 by way of switching the clutch 21. In this state, by activating the second motor 20 into operation, rotation of the second motor 20 is transmitted to the threaded shaft 4 of the building drum D via the inner shaft 14, so as to rotate the threaded shaft 4 forwards or backwards, whereby the moving member 5 thread coupled to the threaded portion 4a of the threaded shaft 4 is moved axially, and the respective segments 1a of the drum main body 1 are made to perform diametrically contracting operations or diametrically expanding operations via the linkage members 6.

As this occurs, load by the first motor 15, which is connected to the outer shaft 3 and is now being in the stopped state, is exerted on the outer shaft 3 to thereby put the outer shaft 3 in a brake applied state. Because of this, even though the threaded shaft 4 inside the outer shaft 3 rotates, there is caused no fear that the outer shaft 3 starts to rotate unintentionally, whereby the expanding or contracting operation can be performed with good stability.

Note that in the embodiment that has been described heretofore, while the building drum D is described as being the belt building drum, configured in a similar way to what has been described above, the invention can be carried out for a driving apparatus for rotating and expanding or contracting a so-called band building drum for building other cylindrical bands used in building a tire such as carcass bands.

INDUSTRIAL APPLICABILITY

The driving apparatus for a tire building drum of the invention can preferably be applied to a driving apparatus for a building drum which is made to perform an expanding or contracting operation of a drum main body by transmitting rotation of a threaded shaft provided on a center shaft portion, for example, a belt building drum for building a belt/tread band.

DESCRIPTION OF REFERENCE CHARACTER AND NUMERALS

Figure 1:
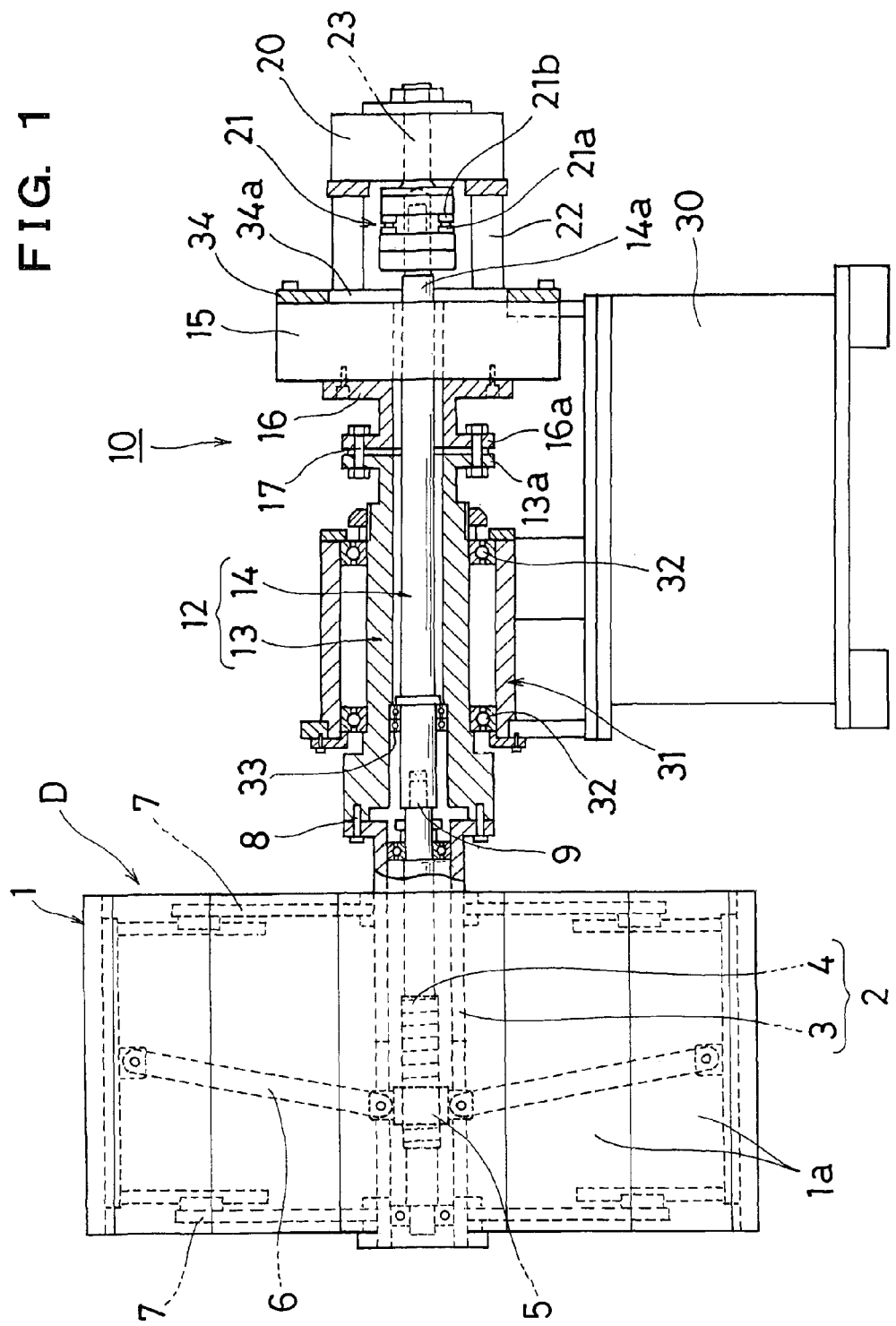
[FIG. 1] A sectional view of a main part which shows an embodiment of a driving apparatus for a tire building drum according to the invention.
Figure 2:
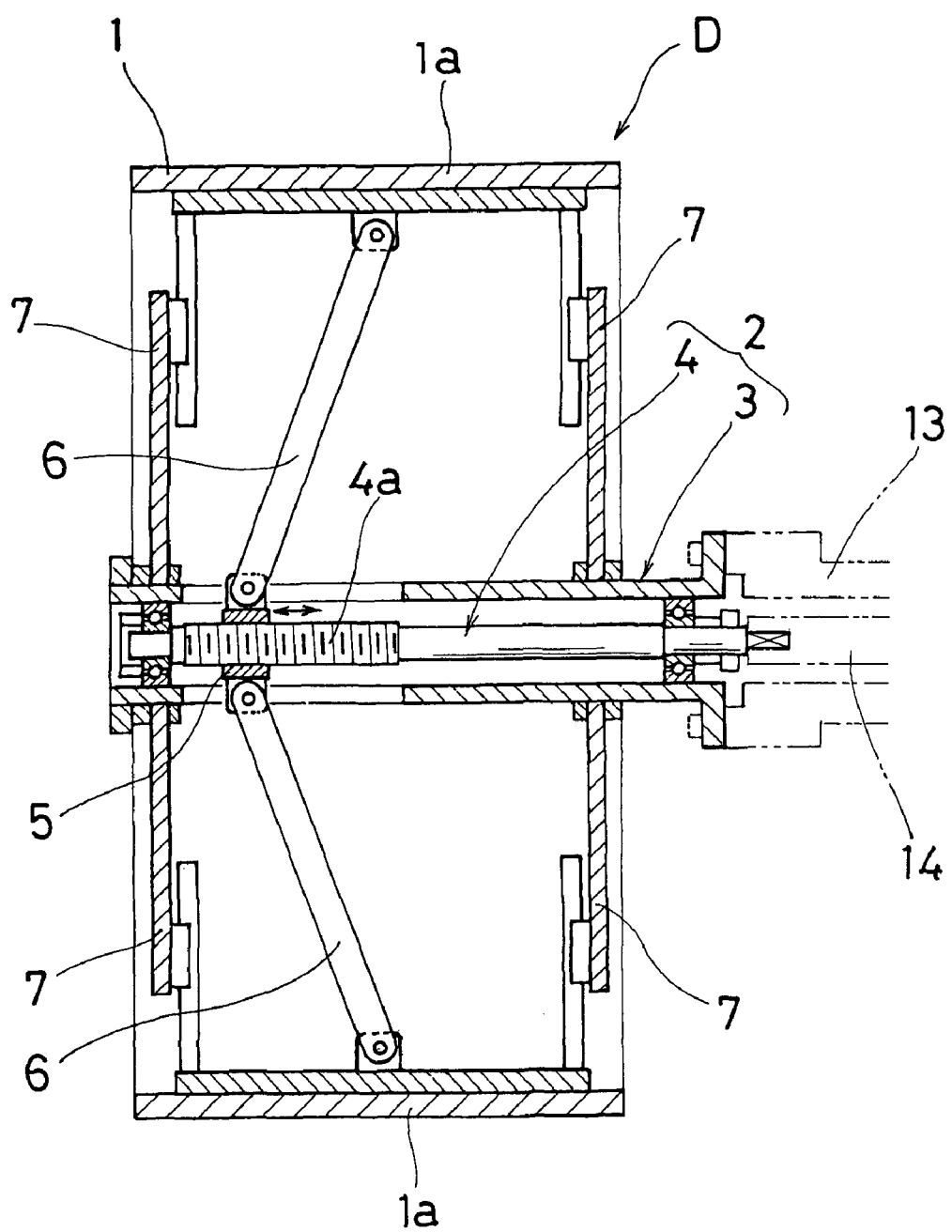
[FIG. 2] A sectional view which shows an expanding/contracting mechanism of the building drum.

D building drum; 1 drum main body; 1a segment; 2 center shaft portion; 3 outer shaft; 4 threaded shaft; 4a threaded portion; 5 moving member; 6 linkage member; 7 support portion; 8 coupling portion; 9 coupling portion; 10 driving apparatus; 12 spindle portion; 13 outer portion; 13a end portion; 14 inner shaft; 14a projecting end side portion; 15 first motor; 16 cylindrical coupling member; 16a end portion; 17 fastening portion; 20 second motor; 21 clutch; 21a engaging member; 21b engaging member; 22 support leg; 23 output shaft; 30 moving support table; 31 support portion; 32 bearing; 33 bearing; 34 support member; 34a central opening.

The invention claimed is:

1. A driving apparatus for a tire building drum in which a drum main body is configured to expand or contract by a plurality of segments which are divided in a circumferential direction and a central shaft portion is made up of a cylindrical outer shaft and a threaded shaft provided inside thereof, comprising:
    a cylindrical outer shaft which is coupled to the outer shaft of the building drum;
    an inner shaft coupled to the threaded shaft;
    first rotational driving means coupled to the outer shaft for rotating the drum; and
    second rotational driving means coupled to the inner shaft via a clutch in such a manner as to be engaged with and disengaged from the inner shaft for expanding or contracting the drum, characterized in that:
    the first rotational driving means and the second rotational driving means comprise motors, respectively, which are driven to rotate by signals from a control unit, the motor which acts as the second rotational driving means being made to rotate forwards and backwards by signals from the control unit which indicate rotational directions, and
    by switching the clutch, when the drum is rotated through operation of the first rotational driving means, the second rotational driving means is held out of engagement with the inner shaft, while when the drum is expanded or contracted, the second rotational driving means is held in engagement with the inner shaft.

2. A driving apparatus for a tire building drum as set forth in claim 1, characterized in that
    the clutch is controlled such that the second rotational driving means is held out of engagement with the inner shaft on other occasions than one the drum is expanded or contracted.

\* \* \* \* \*